United States Patent
Zakharov et al.

(10) Patent No.: US 6,799,568 B2
(45) Date of Patent: Oct. 5, 2004

(54) PROCESS FOR THE PREPARATION OF A CATALYST COMPONENT FOR THE POLYMERIZATION OF AN OLEFIN

(75) Inventors: Vladimir A. Zakharov, Novosibirsk (RU); Gennady D. Bukatov, Novosibirsk (RU); Sergei A. Sergeev, Novosibirsk (RU)

(73) Assignee: DSM N.V., Heerlen (NL)

( * ) Notice: Subject to any disclaimer, the term of this patent is extended or adjusted under 35 U.S.C. 154(b) by 38 days.

(21) Appl. No.: 10/106,795

(22) Filed: Mar. 27, 2002

(65) Prior Publication Data

US 2003/0008983 A1 Jan. 9, 2003

Related U.S. Application Data

(63) Continuation of application No. PCT/NL00/00605, filed on Aug. 30, 2000.

(30) Foreign Application Priority Data

Sep. 27, 1999 (EP) .............................................. 99203144

(51) Int. Cl.[7] .................................................. C08F 4/58
(52) U.S. Cl. .................... 126/128; 526/348; 526/123.1; 526/124.3; 526/158; 526/125.3; 502/103; 502/133; 502/116
(58) Field of Search .............................. 526/348, 123.1, 526/124.3, 158, 125.3, 128; 502/103, 133, 116

(56) References Cited

U.S. PATENT DOCUMENTS 3,907,759 A * 9/1975 Okada et al. .............. 260/88.2
6,051,666 A * 4/2000 Zakharov et al. ........ 526/125.3

FOREIGN PATENT DOCUMENTS

| EP | 0398698 | 11/1990 |
| WO | 9632426 | 10/1996 |
| WO | WO 96/32426 | * 10/1996 |
| WO | 9632427 | 10/1996 |
| WO | WO 96/32427 | * 10/1996 |

* cited by examiner

Primary Examiner—Ling-Siu Choi
(74) Attorney, Agent, or Firm—Pillsbury Winthrop LLP

(57) ABSTRACT

The invention is directed to a process for the preparation of a catalyst component for the polymerization of an olefin by:
 a) contacting metallic magnesium with an organic halide RX, where R is an organic group containing up to 20 carbon atoms and X is a halide, whereupon the dissolved reaction product I is separated from the solid residual products and whereafter,
 b) an alkoxy group or aryloxy group containing silane compound is added to the obtained reaction product I, whereupon the precipitate formed is purified to obtain reaction product II,
 c) which reaction product II is subsequently contacted with $TiCl_4$ and the resulting product is purified to obtain the catalyst component.

Figure 1:
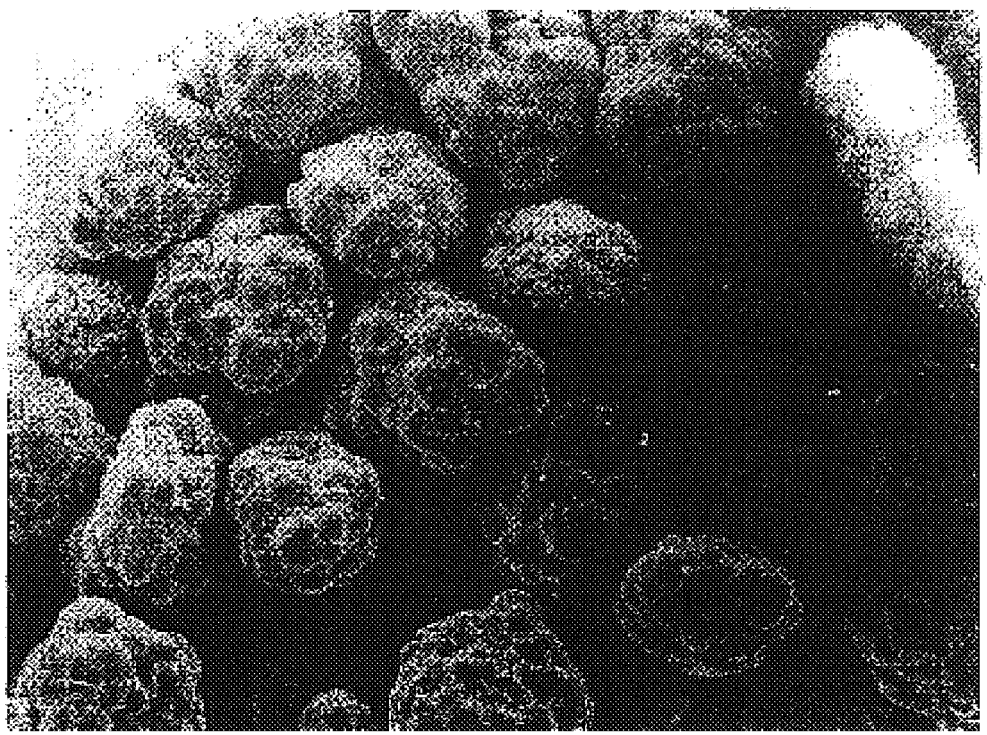

The invention is characterized in that in step b) the silane compound and reaction product I are introduced simultaneously to a mixing device.

11 Claims, 1 Drawing Sheet

PROCESS FOR THE PREPARATION OF A CATALYST COMPONENT FOR THE POLYMERIZATION OF AN OLEFIN

This is a Continuation of International Application No. PCT/NL00/00605 filed Aug. 30, 2000 which designated the U.S. and was published in the English language. The entire contents of the PCT application are hereby incorporated in their entirety by reference.

The invention is directed to a process for the preparation of a catalyst component for the polymerization of an olefin.

Catalyst components on a support for the preparation of polyolefins have a high activity and a high stereospecificity. These catalyst components are already known for a long time. Essential elements for the preparation of such catalyst components are a magnesium-containing support and a titanium compound attached thereto. For the polymerization of olefins also an alkylaluminum compound is needed as a cocatalyst.

High activity supported catalyst components are the most frequently used catalyst components for the polymerization of olefins, such as for instance propylene. By the high activity of the catalyst component a high yield of the polyolefin is obtained per weight percentage of the titanium compound in the catalyst component. Therefore it is no longer needed to remove the catalyst component from the polyolefin produced.

There are several methods to prepare the magnesium-containing support of the catalyst component. It is for instance possible to grind the magnesium-containing support, spraydrying it or to precipitate the magnesium-containing support. The magnesium-containing support can further be treated with a halogenating compound to prepare the magnesium-containing support. Several other methods to prepare magnesium-containing supports are for instance described by E. P. Moore (Jr.), Polypropylene Handbook, Hansen Publishers, 1996, p. 22.

A process for the preparation of such a supported catalyst component is for instance described in WO-A-96/32427. In this patent application a process for the preparation of a catalyst component for the polymerization of an olefin is described. In the preparation of the catalyst component a magnesium compound is contacted with a titanium compound wherein the magnesium compound is obtained by:
  a) contacting metallic magnesium with an aromatic halide RX, where R is an aromatic group containing up to 20 carbon atoms and X is a halide, whereupon the resulting dissolved reaction product I is separated from the solid residual products and whereafter,
  b) an alkoxy group or aryloxy group containing silane compound is added to the obtained reaction product I at a temperature of from −20 to 20° C., whereupon the precipitate formed is purified to obtain reaction product II,
    which reaction product II is subsequently, during a step c), is contacted with $TiCl_4$, and the resulting product is purified to obtain the catalyst component.

Although the performance of this catalyst component is very good and this catalyst component already shows a high activity and selectivity, a more improved catalyst component is obtained by the process of the present invention wherein in step b) the silane compound and reaction product I are introduced simultaneously to a mixing device.

Here and hereafter "simultaneous introduction" means the introduction of reaction product I and the silane compound in such a way that the Mg/Si ratio does not substantially vary during the introduction of these compounds to the mixing device.

This process has the advantage that the morphology of the catalyst particles improves; especially for the larger catalyst particles. Here and hereafter 'morphology' does not only refer to the shape of the catalyst particles, but also to the particle size distribution and the bulk density of the catalyst particles.

The polyolefin powder produced in the polymerization by using the catalyst component has the same morphology as the catalyst component; this is a known effect and is called the "replica effect" (S. van der Ven, Polypropylene and other Polyolefins, Elsevier 1990, p. 8–10). Using the catalyst compound prepared according to the process of the invention almost round polymer particles are obtained with a length/diameter ratio (l/d) smaller than 2 and a good powder flowability, while according to WO-A-96/32427 elongated polymer particles are obtained with a l/d of more than 2.5.

During step b) the dissolved reaction product I, obtained after carrying out step a), is brought into contact with an alkoxy group or aryloxy group containing silane compound in such a way that reaction product I and the silane compound are introduced simultaneously to the mixing device.

The mixing device can have various forms; the mixing device can be a mixing device in which the silane compound is premixed with reaction product I, but the mixing device can also be the reactor in which reaction product II is formed.

The mixing device for simultaneously premixing the silane compound and reaction product I can be a mixing device in which the premixing takes place in a dynamic or a static way. Premixing in a dynamic way can take place by, for instance, mixing, stirring, shaking and by the use of ultrasonic waves. Premixing in a static way can take place in, for instance, a static mixer or in a tube wherein the silane compound and reaction product I are contacted. For the preparation of the catalyst component in big amounts both static and dynamic mixing can be used. Premixing in a dynamic way is preferably used when the catalyst component is prepared in small amounts. For the preparation of the catalyst component in big amounts preferably a static mixer is used for premixing the silane compound and reaction product I. Preferably, the silane compound and reaction product I are premixed before the mixture is introduced to the reactor wherein reaction product II is formed. In this way the catalyst component formed gives polymer particles with the best morphology.

Premixing is performed during 0.1 to 300 seconds; preferably during 1 to 50 seconds.

The temperature during the premixing is between 0 and 80° C.; preferably between 10 and 50° C.

The silane compound and reaction product I can be continuously or batch-wise introduced to the mixing device. Preferably, the silane compound and reaction product I are introduced continuously to the mixing device.

The formation of reaction product II normally takes place at a temperature between −20 and 100° C.; preferably at a temperature of from 0 to 80° C.

Preferably, reaction product I is contacted with the alkoxy group or aryloxy group containing silane compound in the presence of an inert hydrocarbon solvent such as the solvents mentioned further as dispersant in the discussion of step a). The solvent can be a solvent for the silane compound, a dispersant for reaction product I or be present in the reactor wherein reaction product II is collected. Combinations of these three possibilities are also possible.

Preferably, the reactor wherein reaction product II is obtained, is a stirred reactor.

The Si/Mg molar ratio during step b) may vary from 0.2 to 20. Preferably, the Si/Mg molar ratio is from 0.4 to 1.0.

The product from step b), reaction product II, is usually purified by rinsing with an inert hydrocarbon solvent and then used for the further preparation of the catalyst component in step c).

The following examples of alkoxy group or aryloxy group containing silane compounds may be mentioned: tetramethoxysilane, tetraethoxysilane, tetrabutoxysilane, tetraisobutoxysilane, tetraphenoxysilane, tetra(p-methylphenoxy)silane, tetrabenzyloxysilane, methyltrimethoxysilane, methyltriethoxysilane, methyltributoxysilane, methyltriphenoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyltriethyoxysilane, allyltrimethoxysilane, phenyltrimethoxysilane, phenyltriethoxysilane, benzyltriphenoxysilane, methyltriallyloxysilane, dimethyldimethoxysilane, dimethyldiethoxysilane, dimethyldiisopropyloxysilane, dimethyldibutoxysilane, dimethyldihexyloxysilane, dimethyldiphenoxysilane, diethyldiethoxysilane, diethyldiisobutoxysilane, diethyldiphenoxysilane, dibutyldiisopropyloxysilane, dibutyldibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyldiethoxysilane, divinyldiphenoxysilane, diallyldipropoxysilane, diphenyldiallyloxysilane and methylphenyldimethoxysilane.

Preferably use is made of tetraethoxysilane.

Step a) in the process for the preparation of the catalyst component of the invention is carried out by contacting metallic magnesium with an organic halide RX.

All forms of metallic magnesium may be used, but preferably use is made of finely divided metallic magnesium, for example magnesium powder. To obtain a fast reaction it is preferable to heat the magnesium under nitrogen prior to use. In the organic halide RX, R is an organic group preferably containing from 1 up to 20 carbon atoms and X preferably is chlorine or bromine.

Examples of the organic group R are methyl, ethyl, n-propyl, i-propyl, n-butyl, i-butyl, t-butyl, hexyl, octyl, phenyl, tolyl, xylyl, mesityl and benzyl. Combinations of two or more organic halides RX can also be used.

The magnesium and the organic halide RX can be reacted with each other without the use of a separate dispersant; the organic halide RX is then used in excess. The organic halide RX and the magnesium can also be brought into contact with one another in the presence of an inert dispersant. Examples of these dispersants are: aliphatic, alicyclic or aromatic dispersants containing from 4 up to 20 carbon atoms.

Preferably, in step a) also an ether is added to the reaction mixture. Examples of ethers are: diethyl ether, diisopropyl ether, dibutyl ether, diisobutyl ether, diisoamyl ether, diallyl ether, tetrahydrofuran and anisole. Dibutyl ether and/or diisoamyl ether are preferably used.

Preferably, an excess of chlorobenzene is used as the organic halide RX. Thus, the chlorobenzene serves as dispersant as well as organic halide RX. The organic halide/ ether ratio acts upon the activity of the catalyst component. The chlorobenzene/dibutyl ether volume ratio may for example vary between 75:25 and 35:65.

When the chlorobenzene/dibutyl ether ratio decreases, the bulk density of the polyolefine powder prepared with the aid of the catalyst component becomes lower and when the chlorobenzene/dibutyl ether ratio increases, the amount of the dissolved reaction product I becomes lower. Consequently, the best results are obtained when the chlorobenzene/dibutyl ether volume ratio is between 70:30 and 50:50.

Small amounts of iodine and/or alkyl halides can be added to cause the reaction between the metallic magnesium and the organic halide RX to proceed at a higher rate. Examples of alkyl halides are butyl chloride, butyl bromide and 1,2-dibromoethane. When the organic halide RX is an alkyl halide, iodine and 1,2-dibromoethane are preferably used.

The reaction temperature for step a) normally is between 20 and 150° C.; the reaction time between 0.5 and 20 hours.

After the reaction of step a) is completed, the dissolved reaction product I is separated from the solid residual products.

The further preparation of the catalyst component is carried out by contacting, during a step c), the purified reaction product II with $TiCl_4$.

Preferably an internal electron donor is also present during step c). Also mixtures of internal electron donors can be used. Examples of internal electron donors are carboxylic acids, carboxylic acid anhydrides, esters of carboxylic acids, halide carboxylic acids, ethers, ketones, amines, amides, nitrites, aldehydes, alcoholates, sulphonamides, thioethers, thioesters and other organic compounds containing a heteroatom, such as nitrogen, oxygen or phosphorus.

Examples of carboxylic acids are formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and trimellitic acid. Anhydrides of the aforementioned carboxylic acids can be mentioned as examples of carboxylic acid anhydrides, such as acetic acid anhydride, butyric acid anhydride and methacrylic acid anhydride.

Examples of esters of carboxylic acids that can be mentioned are butyl formate, ethyl acetate, butyl acetate, ethyl acrylate, methyl methacrylate, isobutyl methacrylate, methylbenzoate, ethylbenzoate, methyl-p-toluate, ethyl-α-naphthoate, monomethyl phthalate, dibutyl phthalate, diisobutyl phthalate, diallyl phthalate and diphenyl phthalate.

Examples of halide carboxylic acids that can be mentioned are the halides of the above mentioned carboxylic acids, such as acetyl chloride, acetyl bromide, propionyl chloride, butanoyl chloride, butanoyl iodide, benzoyl bromide, p-toluyl chloride and phthaloyl dichloride.

Examples of suitable ethers are diethyl ether, dibutyl ether, diisoamyl ether, anisole and ethylphenyl ether, 2,2-diisobutyl-1,3-dimethoxypropane, 2,2-dicyclopentyl-1,3-dimethoxypropane, 2-ethyl-2-butyl-1,3-dimethoxypropane, 2-isopropyl-2-isopentyl-1,3-dimethoxypropane and 9,9-bis(methoxymethyl)fluorene. Also, tri-ethers can be used.

Examples of other organic compounds containing a heteroatom are thiophenol, 2-methylthiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and diphenylphosphate.

Preferably dibutyl phthalate is used as the internal electron donor.

The $TiCl_4$/Mg molar ratio during step c) preferably is between 10 and 100. Most preferably, this ratio is between 10 and 50. The molar ratio of the internal electron donor, if used, relative to the magnesium in step c) may vary between 0.05 and 0.75. Preferably this molar ratio is between 0.1 and 0.4.

During step c) use is preferably made of an aliphatic or aromatic hydrocarbon compound as a solvent. Most preferably, the solvent is toluene or chlorobenzene.

The reaction temperature during step c) is preferably between 50 and 150° C., most preferably between 60 and 120° C. At higher or lower temperatures the activity of the catalyst component prepared according to the process of the invention becomes lower. The obtained reaction product in step c) is purified, usually with an inert hydrocarbon, to obtain the catalyst component of the invention.

The catalyst component of the invention is suitable for the preparation of polyolefines by polymerising one or more olefines in the presence of the catalyst component and a cocatalyst. The cocatalyst generally is an organometallic compound containing a metal from group 1, 2, 12 or 13 of the Periodic System of the Elements (Handbook of Chemistry and Physics, 70th Edition, CRC Press, 1989–1990). Preferably the cocatalyst is an organoaluminium compound. As the organoaluminium compound use is made of a compound having the formula $R_nAlX_{3-n}$, where X is a halogen atom, an alkoxy group or a hydrogen atom, R is an alkyl group or an aryl group and $1 \leq n \leq 3$. Examples of such an organoaluminium compound are trimethyl aluminium, triethyl aluminium, dimethyl aluminium chloride, diethyl aluminium chloride, diethyl aluminium iodide, diisobutyl aluminium chloride, methyl aluminium dichloride, ethyl aluminium dichloride, ethyl aluminium dibromide, isobutyl aluminium dichloride, ethyl aluminium sesquichloride, dimethyl aluminium methoxide, diethyl aluminium phenoxide, dimethylaluminium hydride and diethyl aluminium hydride.

An external electron donor may also be present during the polymerization of the olefine(s). Examples of possible external electron donors are described above with relation to the execution of step c) in the preparation of the catalyst component as internal electron donors. As external electron donors also organo-silicon compounds can be used. Mixtures of external electron donors can also be used.

Examples of organo-silicon compounds that are suitable as external electron donor are: tetramethoxysilane, tetraethoxysilane, methyltrimethoxysilane, methyltributoxysilane, ethyltriethoxysilane, phenyltriethoxysilane, diethyldiphenoxysilane, diisopropylsilane, diisobutylsilane, n-propyltrimethoxysilane, cyclohexylmethyldimethoxysilane, dicyclopentyldimethoxysilane, isobutylisopropyldimethoxylsilane, phenyltrimethoxysilane, diphenyldimethoxysilane, trifluoropropylmethyldimethoxysilane, bis(perhydroisoquinolino)dimethoxysilane, dicyclohexyldimethoxysilane, dinorbornyldimethoxysilane, di(n-propyl)dimethoxysilane and di(n-butyl)dimethoxysilane.

Preferably an alkoxysilane is used as the external electron donor during the polymerization.

The molar ratio of the metal in the cocatalyst relative to the Ti during the polymerization may vary from 0.1 to 2000. Preferably this ratio is between 5 and 300. The aluminium/electron donor molar ratio in the polymerization mixture is between 0.1 and 200; preferably between 3 and 100.

The catalyst component of the present invention is suitable for the polymerization of mono- and diolefins containing from 2 to 10 carbon atoms, such as ethylene, propylene, butylene, hexene, octene, butadiene and mixtures thereof. The catalyst component is particularly suitable for the polymerization of propylene and mixtures of propylene and ethylene.

The polymerization can be carried out in the gas phase or in the liquid phase. In the case of polymerization in the liquid phase a dispersing agent is present, such as n-butane, isobutane, n-pentane, isopentane, hexane, heptane, octane, cyclohexane, benzene, toluene or xylene. Liquid olefine can also be used as a dispersing agent.

The polymerization temperature is usually between 0° C. and 120° C., preferably it is between 40° C. and 100° C.

The pressure during the polymerization is normally between 0.1 and 6 MPa. The molecular weight of the polyolefine that is formed during the polymerization can be controlled by adding during the polymerization hydrogen or any other agent known to be suitable for the purpose.

The polymerization can be carried out in continuous mode or batchwise. The polymerization can be carried out in several, successive steps. The polymerization can also be carried out by first effecting the polymerization in the liquid phase and then in the gas phase.

The invention will be further elucidated with examples without being limited thereto, and with the assistance of the accompanying drawings, in which:

BRIEF DESCRIPTION OF THE DRAWING FIGURES

Figure 2:
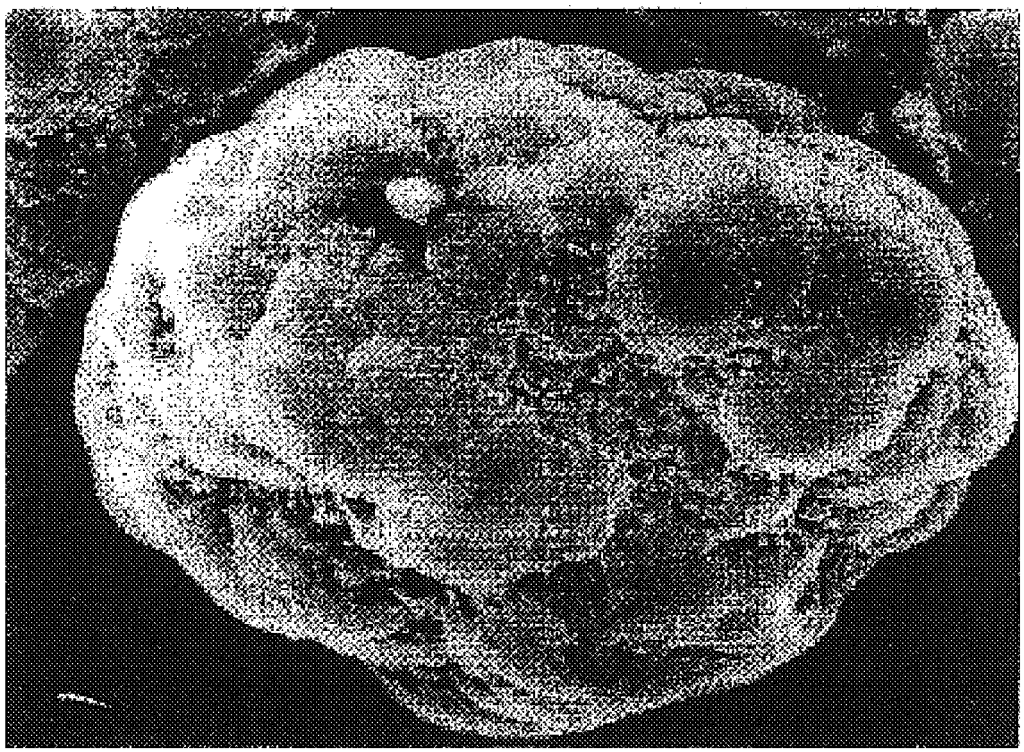

FIG. 1 is a photograph (magnified) of the polymer powder obtained in Example I; and FIG. 2 is a photograph (magnified) of the polymer powder obtained in Comparative Example A.

EXAMPLES

Abbreviations and Measuring Methods

The weight percentage of atactic polypropylene (APP) was determined as follows: 100 ml of the filtrate (y ml) obtained in separating the polypropylene powder (x g) and the heptane was dried over a steam bath and then under vacuum at 60° C. That yielded z g of APP. The total amount of APP (q g) is: $(y/100)*z$. The weight percentage of APP is: $(q/(q+x))*100\%$.

The isotacticity index (I.I.) of the polypropylene powder was determined as follows: 5 g of polypropylene powder was extracted with the aid of n-heptane in a Soxhlet extractor for 4 hours. The weight percentage of the polypropylene powder that does not dissolve in the n-heptane is the isotacticity index.

The bulk density (BD) of the polypropylene powder was determined according to ASTM D1895.

The $d_{50}$ PP and the span of PP powder were determined according to ASTM D1921, method A.

The $d_{50}$ cat value ($\mu$m) was calculated as follows: $d_{50}$ PP*$[1.3\ Y^{1/3}]^{-1}$, wherein Y is the number of g of PP powder obtained per g of the catalyst component.

EXAMPLE I

Preparation of the Reaction Product I

A flask, fitted with a reflux condenser and a funnel, was filled with magnesium powder (24.3 g, 1 mol). The flask was brought under nitrogen. The magnesium was heated at 80° C. for 1 hour, after which a mixture of dibutyl ether (170 ml) and chlorobenzene (60 ml) was added. Then iodine (0.03 g) and n-chlorobutane (3 ml) were successively added to the reaction mixture. After the colour of the iodine had disappeared, the temperature was raised to 97° C. and chlorobenzene (220 ml) was slowly added for 2.5 hours. The dark reaction mixture that was formed in the process was stirred for another 8 hours at 97° C. Then the stirring and heating were stopped and the solid material was allowed to settle for 48 hours. By decanting the solution above the precipitate, a solution of phenylmagnesiumchloride ($Ph_xCl_{2-x}$, reaction product I) with a concentration of 1.36 mol Mg/l has been obtained. This solution was used in the further catalyst preparation.

Preparation of the Reaction Product II

The solution of reaction product I (200 ml, 0.272 mol Mg) and 100 ml of a solution of tetraethoxysilane (TES) in dibutyl ether (DBE), (33.4 ml of TES and 66.6 ml of DBE), were cooled to 15° C., and then were dosed simultaneously to a mixing device of 0.45 ml volume supplied with a stirrer and jacket. Thereafter the premixed reaction product I and the TES-solution were introduced to a reactor. The mixing device (minimixer) was cooled to 10° C. by means of cold water circulating in the minimixer's jacket. The reagents contact time was 13 s in the minimixer and the connecting tube between the minimixer and the reactor. The stirring speed in the minimixer was 1000 rpm. The temperature of the mixture at the minimixer outlet was 40° C. The mixture formed in the minimixer was introduced to a 0.7 l reactor, with stirring. The reactor was loaded preliminary with 100 ml of DBE, and cooled to 5° C. Dosing time was 1 hour. The stirring speed in the reactor was 200 rpm.

On the dosing completion the reaction mixture was kept at 5° C. for 0.5 hour, then heated up to 60° C. and kept at this temperature for 1 hour. Then the stirring was stopped and the solid substance was allowed to settle. The supernatant was removed by decanting. The solid substance was washed three times using 300 ml of heptane. As a result, a pale yellow solid substance, reaction product II, was obtained, suspended in 110 ml of heptane.

Preparation of the Catalyst Component

A reactor was brought under nitrogen and 300 ml of titanium tetrachloride, a slurry, containing 12 g of reaction product II in 36 ml of heptane, and dibutyl phthalate (7.2 ml) were added to it. Then the reaction mixture was kept at 115° C. for 2 hours. Then the stirring was stopped and the solid substance was allowed to settle. The supernatant was removed by decanting, after which a mixture of titanium tetrachloride (150 ml ) and chlorobenzene (150 ml) was added. The reaction mixture was kept at 115° C. for 30 min, after which the solid substance was allowed to settle, and the last treatment was repeated once again. The solid substance obtained was washed five times using 300 ml of heptane at 60° C., after which the catalyst component, suspended in heptane, was obtained.

Polymerization of Propylene

Polymerization of propylene was carried out in a stainless steel reactor (with a volume of 0.7 l) in heptane (300 ml) at a temperature of 70° C., total pressure 0.5 MPa and hydrogen presence (55 ml) for 2 hours. The concentration of the catalyst component was 0.033 g/l; the concentration of triethylaluminium: 4.0 mmol/l; the concentration of propyltrimethoxysilane: 0.4 mmol/l. Data on the catalyst performance during the propylene polymerization are presented in Table 1. The particles of the polymer powder obtained had a round shape (FIG. 1).

EXAMPLE II

Preparation of reaction products I and II was carried out as described in Example I, except that the simultaneous premixing of the solutions of the reaction product I and tetraethoxysilane was carried out in a capillary tube instead of in a minimixer. Premixing time was 4 s.

Preparation of the catalyst component and the polymerization of propylene in this Example II was carried out as described in Example I. The results are presented in Table 1. The particles of the polymer powder obtained had a partially elongated shape.

Comparative Experiment A

Reaction product I was prepared as described in Example I.

Preparation of the Reaction Product II

The solution of reaction product I (200 ml, 0.272 mol Mg) was loaded into a reactor and cooled to 5° C. The mixture of TES (33.4 ml) and DBE (66.6 ml) was dosed into the reactor under stirring for 1 hour. On the dosing completion the preparation of reaction product II was the same as described in Example I.

Preparation of the catalyst component and the polymerization of propylene were carried out as described in Example I. The final results are presented in Table 1. All particles of polymer powder had an elongated shape (FIG. 2).

EXAMPLE III

Preparation of the Reaction Product I

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colourless solution above the precipitate, a solution of butylmagnesiumchloride (reaction product I) with a concentration of 1.0 mol Mg/l was obtained.

Preparation of the reaction product II was carried out as described in Example I, except that a solution of reaction product I from Example III (200 ml, 0.2 mol Mg) and 100 ml of the solution of tetraethoxysilane (TES) in dibutyl ether (DBE), (17 ml of TES and 83 ml of DBE), were cooled to 10° C., and then were dosed simultaneously to a stirred minimixer of 0.45 ml volume during 100 min. The minimixer was cooled to 10° C. by means of cold water circulating in the minimixer's jacket. The reagents contact time was 13 s in the minimixer and the connecting tube between the minimixer and the reactor.

After premixing the mixture was introduced to a 0.7 l reactor, with stirring. The reactor was loaded preliminary with 100 ml of DBE, and cooled to −12° C. On the dosing completion the preparation of reaction product II was the same as described in Example I.

Preparation of the catalyst component and the polymerization of propylene were carried out as described in Example I. Data on the catalyst performance are presented in Table 1. The particles of the polymer powder obtained had a round shape.

Comparative Experiment B

Reaction product I was prepared as described in Example III.

Preparation of the Reaction Product II

The solution of reaction product I (200 ml, 0.2 mol Mg) was loaded into a reactor and cooled to −12° C. The mixture of TES (17 ml) and DBE (83 ml) was dosed into a reactor under stirring for 100 min. On the dosing completion the preparation of reaction product II was the same as described in Example I.

Preparation of the catalyst component and the polymerization of propylene were carried out as described in Example I. Data on the catalyst performance are presented in Table 1. The particles of the polymer powder obtained had a round shape.

EXAMPLE IV
Preparation of the Reaction Product I

A stirred flask, fitted with a reflux condenser and a funnel, was filled with magnesium powder (19.5 g, 0.8 mol). The flask was brought under nitrogen. The magnesium was heated at 80° C. for 1 hour, after which heptane (100 ml), iodine (0.03 g) and n-chlorobutane (3 ml) were successively added to the reactor with stirring. After the colour of the iodine had disappeared, the temperature was raised to 70° C. and a mixture of n-chlorobutane (38.5 ml), ethylbromide (30 ml) and 800 ml of heptane was slowly added for 2.5 hours. The reaction mixture was stirred for another 3 hours at 70° C. Then the stirring and heating were stopped and the solid material was allowed to settle for 48 hours. By decanting the colourless solution above the precipitate, a solution of ethylbutylmagnesium (reaction product I) with a concentration of 0.35 mol Mg/l was obtained.

Preparation of the Reaction Product II

The solution of reaction product I (200 ml, 0.07 mol Mg) and 100 ml of a solution of tetraethoxysilane in heptane, (12.5 ml of TES and 87.5 ml of heptane), were heated to 30° C., and then were dosed simultaneously to a stirred minimixer of 0.45 ml volume. The minimixer was heated to 30° C. The reagents contact time was 22 s in the minimixer and the connecting tube between the minimixer and the reactor. After premixing the mixture was introduced to a 0.7 l reactor, with stirring. The reactor was loaded preliminary with 100 ml of heptane, and heated to 30° C. Dosing time was 100 min.

On the dosing completion the reaction mixture was kept at 30° C. for 0.5 hour, then heated up to 60° C. and kept at this temperature for 1 hour. Then the preparation of reaction product II was the same as described in Example I.

Preparation of the catalyst component and the polymerization of propylene were carried out as described in Example I. Data on the catalyst performance are presented in Table 1. The particles of the polymer powder obtained had a non-regular shape.

Comparative Experiment C

Reaction product I was prepared as described in Example IV.

Preparation of the Reaction Product II

The solution of reaction product I (200 ml, 0.07 mol Mg) was loaded into a reactor and heated to 30° C. A mixture of TES (12.5 ml) and heptane (87.5 ml) was dosed into a reactor under stirring for 100 min. On the dosing completion the preparation of reaction product II was the same as described in Example IV.

Preparation of the catalyst component and the polymerization of propylene were carried out as described in Example I. Data on the catalyst performance are presented in Table 1. The particles of the polymer powder obtained had a non-regular shape.

EXAMPLE V

Reaction product I was prepared as described in Example 1.

Preparation of the Reaction Product II 100 ml of dibutyl ether was loaded into a 0.7 l reactor and cooled to 5° C. 200 ml of reaction product 1 and 100 ml of TES solution (33.4 ml of TES and 66.6 ml of DBE) were dosed simultaneously to a reactor via two separate tubes. Dosing time was 1 hour. On the dosing completion the preparation of reaction product II was the same as described in Example I.

Preparation of the catalyst component and the polymerization of propylene were carried out as described in Example I. Data on the catalyst performance are presented in Table 2.

EXAMPLE VI

Reaction product I was prepared as described in Example I, except that were used: 19.6 g of magnesium powder, 140 ml of dibutyl ether and 310 ml of chlorobenzene. As a result, a solution with a concentration of 1.1 mol Mg/l was obtained.

Preparation of the Reaction Product II 100 ml of dibutyl ether was loaded into a 0.7 l reactor and cooled to 10° C. 200 ml of reaction product 1 and 100 ml of a TES solution (27 ml of TES and 73 ml of DBE) were dosed simultaneously to a reactor via two separate tubes. Dosing time was 1 hour. On the dosing completion the preparation of reaction product II was the same as described in Example I.

Preparation of the catalyst component and the polymerization of propylene were carried out as described in Example I. Data on the catalyst performance are presented in Table 2.

EXAMPLE VII

Reaction product I was prepared as described in Example I.

Reaction product II was prepared as described in Example VI, except that the reactor temperature on dosing was 20° C.

Preparation of the catalyst component and the polymerization of propylene were carried out as described in Example I. The final results are given in Table 2.

EXAMPLE VIII

Reaction product I was prepared as described in Example I.

Reaction product II was prepared as described in Example VI, except that the dosing temperature in reactor was 30° C.

Preparation of the catalyst component and the polymerization of propylene were carried out as described in Example I. The final results are given in Table 2.

EXAMPLE IX

Reaction product I was prepared as described in Example I.

Preparation of the reaction product II was carried out as described in Example I, except that before premixing the solutions of the reaction product I and tetraethoxysilane were cooled to −15° C., and as a result the temperature of the mixture at the minimixer outlet was 16° C.

Preparation of the catalyst component and the polymerization of propylene were carried out as described in Example I. The final results are presented in Table 3.

EXAMPLE X

Reaction product I was prepared as described in Example I.

Preparation of the reaction product II was carried out as described in Example I, except that before premixing the solutions of the reaction product I and tetraethoxysilane were heated to 55° C., and as a result the temperature of the mixture at the minimixer outlet was 66° C.

Preparation of the catalyst component and the polymerization of propylene was carried out as described in Example I. The final results are presented in Table 3.

EXAMPLE XI

Reaction product I was prepared as described in Example I.

Preparation of the reaction product II was carried out as described in Example I, except that the volume of the solutions of the reaction product I and tetraethoxysilane was two times larger than that in Example 1, and as a result the premixing time was two times less: 6.5 s.

Preparation of the catalyst component and the polymerization of propylene were carried out as described in Example I. The final results are presented in Table 3.

EXAMPLE XII

Reaction product I was prepared as described in Example I.

Preparation of the reaction product II was carried out as described in Example I, except that the total volume of the minimixer and tube between minimixer and reactor was two times larger than that in Example I, and as a result the premixing time was two times longer: 26 s.

Preparation of the catalyst component and the polymerization of propylene were carried out as described in Example I. The final results are presented in Table 3.

EXAMPLE XIII

Reaction product I was prepared as described in Example I.

Preparation of the reaction product II was carried out as described in Example XII, except that the solutions of the reaction product I and tetraethoxysilane were cooled to −15° C., as in Example IX, and as a result the temperature of the mixture at the minimixer outlet was 16° C.

Preparation of the catalyst component and the polymerization of propylene were carried out as described in Example I. The final results are presented in Table 3.

EXAMPLE XIV

Reaction product I was prepared as described in Example I, except that a solution with a concentration of 1.3 mol Mg/l was prepared.

Preparation of the reaction product II was as described in Example I, except that the reactor was cooled to 0° C.

Preparation of the catalyst component and the polymerization of propylene were carried out as described in Example I. The final results are presented in Table 4.

EXAMPLE XV

Reaction product I was prepared as described in Example I.

Preparation of the reaction product II was as described in Example XIV, except that the premixing time was 6.5 s, and the dosing time was 30 min.

Preparation of the catalyst component and the polymerization of propylene were carried out as described in Example I. The final results are presented in Table 4.

EXAMPLE XVI

Preparation of reaction product I was carried out as described in Example I, except that the quantities of the reagents were: magnesium: 360 g; dibutyl ether: 2.6 l; chlorobenzene: 4.6 l; n-chlorobutane: 50 ml; iodine: 0.5 g. The preparation was carried out in a stainless steel reactor of 9 l volume. As a result, a solution (ca. 4 l) of reaction product I with a concentration of 1.3 mol Mg/l was prepared.

Preparation of the reaction product II was carried out as described in Example I, except that the quantity of the reagents was 10 times larger, the premixing of the reagents was carried out in a stirred minimixer of 4 ml volume and the volume of the stainless steel reactor was 5 l. The dosing time was 120 min. The stirring speed in the minimixer and the reactor was 600 and 150 rpm, respectively.

Preparation of the catalyst component and the polymerization of propylene was carried out as described in Example I, except that the quantity of reagents was 20 times larger and the preparation was carried out in a stainless steel reactor of 9 l volume. The final results are presented in Table 4.

EXAMPLE XVII

Preparation of reaction product I was carried out as described in Example I, except that the quantities of the reagents were: magnesium: 292 g; dibutyl ether: 2 l; chlorobenzene: 4.6 l. As a result, 4 l of solution of reaction product I with a concentration of 1 mol Mg/l was obtained.

Preparation of reaction product II was carried out as described in Example I, except that the volume of the minimixer was 0.15 ml, the premixing time was 19 s, the dosing time was 120 min. and the volume of DBE in the reactor was 250 ml.

Preparation of the catalyst component and the polymerization of propylene were carried out as described in Example I. The final results are presented in Table 4.

EXAMPLE XVIII

Preparation of the reaction product I was carried out as described in Example XVII.

Preparation of the reaction product II was carried out in a stainless steel reactor of 5 l volume, the volume of the stirred minimixer was 1.4 ml, the quantity of reagents was 8 times larger than that in Example XVII; the premixing time was 19 s and the dosing time was 240 min.

Preparation of the catalyst component was carried out as described in Example I, except that the quantities of reagents were 20 times larger and the preparation was carried out in a stainless steel reactor of 9 l volume.

The polymerization of propylene was carried out as described in Example I. The final results are presented in Table 4.

EXAMPLE XIX

Preparation of the reaction product I was carried out as described in Example I, except that the quantity of magnesium was 380 g. As a result, 3.6 l of a solution of reaction product I with a concentration of 1.4 mol Mg/l was obtained.

Preparation of the reaction product II was carried out as described in Example I, except that the quantities of the reagents were 10 times larger, the premixing of reagents was carried out in a stirred minimixer of 4 ml volume and the volume of the stainless steel reactor was 5 l. The premixing time was 7.2 sec, the dosing time was 70 min, the temperature in the reactor was 10° C. and the stirring speed in the reactor was 125 rpm.

Preparation of the catalyst component was carried out as described in Example I, except that the quantities of reagents were 20 times larger and the preparation was carried out in a stainless steel reactor of 9 l volume.

The polymerization of propylene was carried out as described in Example I. The final results are presented in Table 4.

EXAMPLE XX

Preparation of the reaction product I was carried out as described in Example XVI.

Preparation of the Reaction Product II 130 ml of dibutyl ether was introduced to a reactor. The reactor was thermostated at 20° C. Then a solution of reaction product I (400 ml, 0.52 mol Mg) and a solution of tetraethoxysilane (64 ml) in dibutyl ether (136 ml) was dosed into the reactor for 400 min. with preliminary mixing in a minimixer of 0.15 ml volume. The solution of reaction product I and the TES solution were preliminary cooled as in Example I. Premixing time was 18 s. On the dosing completion the preparation of reaction product II was the same as described in Example I.

Preparation of the catalyst component and the polymerization of propylene were carried out as described in Example I. The final results are presented in Table 4.

EXAMPLE XXI

Reaction product I was prepared as described in Example I.

Preparation of the reaction product II was as described in Example XX, except that the dosing temperature of the reactor was 30° C.

Preparation of the catalyst component and the polymerization of propylene were carried out as described in Example I. The final results are presented in Table 4.

EXAMPLE XXII

Reaction product I was prepared as described in Example I.

Preparation of the reaction product II was as described in Example XXI, except that the quantities of reagents were 2.5 times larger and the dosing time was 18 hours.

Preparation of the catalyst component and the polymerization of propylene were carried out as described in Example I. The final results are presented in Table 4.

The invention is directed to the production of a catalyst component and/or polymer particles with an improved morphology over the catalysts and/or polymer particles described in WO-A-96/32427.

When comparing Examples 1 and 2 with Comparative Experiment A, the improved morphology is illustrated by the round particles and the higher bulk density.

When comparing Example 3 with Comparative Experiment B, the improved morphology is illustrated by a narrow particle size distribution and a higher bulk density.

When comparing Example 4 with Comparative Experiment C, the improved morphology is illustrated by a higher bulk density.

Also the catalyst yield has greatly improved.

TABLE 1

| Ex. No. | reaction product II type | [Mg] mol/l | Ti, wt. % | Yield, kg PP/g cat | APP, wt. % | I.I., wt. % | BD, g/l | $D_{50}$PP, $\mu$m | SPAN | $d_{50}$cat. $\mu$m |
|---|---|---|---|---|---|---|---|---|---|---|
| I | $Ph_xMgCl_{2-x}$ | 1.36 | 2.6 | 7.1 | 1.1 | 98.0 | 380 | 890 | 0.44 | 32.0 |
| II | $Ph_xMgCl_{2-x}$ | 1.36 | 2.6 | 8.7 | 0.9 | 97.2 | 350 | 1260 | 0.63 | 47.0 |
| A | $Ph_xMgCl_{2-x}$ | 1.36 | 2.9 | 5.0 | 1.2 | 97.5 | 280 | 700 | 0.63 | 31.5 |
| III | BuMgCl | 1.0 | 2.6 | 5.2 | 1.0 | 97.6 | 430 | 370 | 0.4 | 16.0 |
| B | BuMgCl | 1.0 | 2.2 | 4.3 | 0.5 | 98.5 | 410 | 430 | 1.1 | 20.0 |
| IV | EtMgBu | 0.35 | 3.8 | 9.8 | 1.2 | 97.2 | 310 | 1400 | 2.0 | 50.5 |
| C | EtMgBu | 0.35 | 5.3 | 6.6 | 1.4 | 97.0 | 270 | 1420 | 2.0 | 58.5 |

TABLE 2

| Ex. No. | Dosing temperature, ° C. | Ti, wt. % | Yield, kg PP/g cat | APP, wt. % | I.I. wt. % | BD, g/l | $D_{50}$PP, $\mu$m | SPAN | $d_{50}$cat., $\mu$m |
|---|---|---|---|---|---|---|---|---|---|
| V | 5 | 2.3 | 8.8 | 0.8 | 98.2 | 360 | 930 | 0.61 | 35 |
| VI | 10 | 1.7 | 7.0 | 0.8 | 98.2 | 400 | 720 | 0.89 | 29 |
| VII | 20 | 2.4 | 6.9 | 0.8 | 97.9 | 370 | 710 | 0.5 | 28 |
| VIII | 30 | 2.6 | 7.4 | 0.7 | 98.0 | 330 | 900 | 0.9 | 36 |

TABLE 3

| Ex. No. | Temperature of mixture (at the minimixer outlet), ° C. | Premixing time, sec | Ti, wt. % | Yield, kg PP/g cat | APP, wt. % | I.I. wt. % | BD, g/l | $D_{50}$PP, $\mu$m | SPAN | $d_{50}$cat., $\mu$m |
|---|---|---|---|---|---|---|---|---|---|---|
| IX | 16 | 13 | 3.2 | 6.7 | 0.8 | 97.4 | 375 | 850 | 0.51 | 35 |
| X | 66 | 13 | 3.1 | 7.8 | 1.1 | 97.4 | 385 | 420 | 0.95 | 16 |

TABLE 3-continued

| Ex. No. | Temperature of mixture (at the minimixer outlet), °C. | Premixing time, sec | Ti, wt. % | Yield, kg PP/g cat | APP, wt. % | I.I. wt. % | BD, g/l | $D_{50}$PP, μm | SPAN | $d_{50}$cat., μm |
|---|---|---|---|---|---|---|---|---|---|---|
| XI | 40 | 6.5 | 2.8 | 6.4 | 1.0 | 96.8 | 330 | 1170 | 0.72 | 48 |
| XII | 40 | 26 | 2.2 | 6.8 | 1.0 | 96.4 | 370 | 580 | 0.41 | 24 |
| XIII | 16 | 26 | 2.4 | 7.9 | 0.9 | 96.5 | 400 | 940 | 0.31 | 36 |

TABLE 4

| Ex. No. | Dosing temperature in reactor, °C. | Dosing time, min | Ti, wt. % | Yield, kg PP/g cat | APP, wt. % | I.I. wt. % | BD, g/l | $D_{50}$PP, μm | SPAN | $d_{50}$cat., μm |
|---|---|---|---|---|---|---|---|---|---|---|
| XIV | 0 | 60 | 2.2 | 8.0 | 0.8 | 97.9 | 400 | 890 | 0.25 | 34 |
| XV | 0 | 30 | 2.4 | 6.8 | 1.2 | 97.5 | 390 | 1030 | 0.95 | 42 |
| XVI | 5 | 120 | 2.1 | 8.4 | 0.6 | 98.3 | 415 | 870 | 0.31 | 33 |
| XVII | 5 | 120 | 2.7 | 9.4 | 0.8 | 98.0 | 405 | 520 | 0.21 | 19 |
| XVIII | 5 | 240 | 2.5 | 11.5 | 0.5 | 98.5 | 430 | 440 | 0.41 | 15 |
| XIX | 10 | 70 | 2.4 | 10.0 | 0.5 | 98.3 | 340 | 1900 | 0.66 | 70 |
| XX | 20 | 400 | 2.8 | 7.4 | 0.7 | 97.8 | 425 | 1040 | 0.31 | 45 |
| XXI | 30 | 400 | 2.9 | 7.0 | 0.6 | 98.0 | 435 | 1000 | 0.40 | 39 |
| XXII | 30 | 1080 | 2.6 | 7.2 | 0.6 | 98.2 | 450 | 770 | 0.64 | 31 |

What is claimed is:

1. Process for the preparation of a catalyst component for the polymerization of an olefin comprising:
   a) contacting metallic magnesium with an organic halide RX, where R is an organic group containing up to 20 carbon atoms and X is a halide, and separating the resulting dissolved reaction product I from the solid residual products,
   b) adding an alkoxy group or aryloxy group containing silane compound to the obtained reaction product I, whereupon the precipitate formed is purified to obtain reaction product II, and
   c) contacting the reaction product II with $TiCl_4$ and purifying the resulting product to obtain the catalyst component,
   wherein in step b) the silane compound and reaction product I are introduced simultaneously to a mixing device.

2. Process according to claim 1, which further comprises premixing the silane compound and reaction product I before introduction of the mixture in the reactor wherein reaction product II is obtained.

3. Process according to claim 2, which comprises premixing the silane compound and the reaction product I in a static mixer.

4. Process according to claim 2, wherein premixing is performed during 0.1 to 300 seconds.

5. Process according to claim 4, wherein premixing is performed during 1 to 50 seconds.

6. Process according to claim 1, wherein the temperature in the mixing device is 0 to 80° C.

7. Process according to claim 2, wherein the temperature during premixing is between 10 and 50° C.

8. Process according to claim 1, wherein the mixing device is a reactor in which reaction product II is formed.

9. Process according to claim 1, wherein an internal donor compound is introduced during step c).

10. Process for the polymerization of one or more olefins using a catalyst component and a cocatalyst, wherein a catalyst component obtained by a process according to claim 1 is used.

11. Process according to claim 10, wherein propylene or a mixture of propylene and ethylene is polymerised.

* * * * *